United States Patent Office 3,704,218
Patented Nov. 28, 1972

3,704,218
ELECTRODIALYSIS METHOD USING ION EXCHANGE MEMBRANES
Masaaki Kato and Shigeta Sato, Yokohama, Japan, assignors to Asahi Kasei Kogyo Kabushiki Kaisha, Osaka, Japan
Filed Dec. 16, 1969, Ser. No. 885,530
Claims priority, application Japan, Dec. 16, 1968, 43/91,561
Int. Cl. B01d 13/02, 59/42
U.S. Cl. 204—180 P
16 Claims

ABSTRACT OF THE DISCLOSURE

Hydrogen ions and hydroxyl ions are generated economically in an electrodialysis cell comprised of a plurality of anion exchange membranes and cation exchange membranes alternately juxtaposed between a pair of an anode and a cathode by filling aqueous solution or suspension containing at least one electrolyte which is incapable of passing through the ion exchange membrane and is selected from the group consisting of (1) water soluble polyelectrolytes (polymeric electrolytes) having negatively charged fixed groups and (2) finely pulverized water-insoluble solid electrolytes having negatively charged fixed groups in the water decomposition compartments and passing a direct current between the electrodes. Polyvalent metal ions in a valence state of at least 2 may be added to said solution or suspension.

---

This invention relates to a method for generating hydrogen ions and hydroxyl ions, and more particularly to a method for producing an acid and an alkali by passing a direct current through a system where an aqueous solution or suspension containing at least one electrolyte which is incapable of passing through ion exchange membrane and is selected from the group consisting of (1) water soluble polyelectrolytes having negatively charged fixed groups and (2) finely pulverized water insoluble solid solid electrolytes having negatively charged fixed groups, and further polyvalent metal ions in a valence state of at least 2, preferably in a valence state of from 2 to 4, if necessary, in the water decomposition compartments formed between a cation exchange membrane on the cathode side and an anion exchange membrane on the anode side.

A principal object of the present invention is to provide a novel method for generating hydrogen ions and hydroxyl ions at a low cost and obtaining an acid solution and an alkali solution.

Heretofore, a method based on bipolar membranes has been proposed as a method for generating hydrogen ions and hydroxyl ions.

Bipolar membranes generally refer to composite membranes having cation exchange groups on one side and anion exchange groups on the other side, usually prepared by lining or bonding a cation exchange membrane and an anion exchange membrane together.

For example, Japanese patent publication No. 3962/57 proposed a multi-compartment type, electrodialysis method using bipolar ion-exchange resin membranes prepared by bonding a cation exchange membrane, which had been prepared by pulverizing Amberlite IR120 to fine powders and rolling the powders to a film by means of polyvinyl chloride resins as a binder, with an anion exchange membrane, which had been prepared by pulverizing Amberlite IRA410 to fine particles and rolling the particles to a film by means of polyvinyl chloride resin as a binder, by means of polyethylene imine and epichlorhydrin, and curing the thus bonded membranes.

Another Japanese patent publication No. 14531/60 proposed the use of bipolar ion-exchange resin membranes prepared by kneading finely powdered anion or cation exchange resins and thermoplastic, electro-insulating resins by help of a suitable solvent, making them plastic, rolling them to a single cation or anion exchange membrane, applying a paste mixture of finely pulverized strongly acidic or strongly basic ion exchange resin and a thermoplastic, electro-insulating resin solution to one side each of the thus prepared cation and anion exchange membranes, placing the applied surface upon the other applied surface, rolling and bonding the membranes placed one upon another in a plastic state by pressing, and then removing the solvent therefrom.

Still another Japanese patent publication No. 16633/63 proposed bipolar ion-exchange resin membranes prepared by applying a mixture of partially polymerized vinyl pyridine and epoxy resins to a cation exchange membrane, and irradiating the membrane with radioactive rays during the curing.

However, all of these well-known methods are based on a bipolar membrane prepared by bonding a cation exchange membrane to an anion exchange membrane by their specific procedures. Owing to the difficulty in bonding technique, high manufacturing cost of the bipolar membranes, and unsatisfactory properties of the thus obtained bipolar membranes, which will be mentioned later, it cannot be said that these well-known methods can provide a satisfactory industrial technique.

That is to say, Japanese patent publication No. 3962/57 discloses an example of the use of 0.5 N NaCl in a cell compartment at a voltage of 2.9 volts/one unit cell and a current density of 2.1 amp./dm.$^2$ and $\eta_H$=43.08% and $\eta_{OH}$=52.36%, but both voltage and current efficiency are not so good.

Japanese patent publication No. 14531/60 discloses an example for producing 0.5 N NaOH and 0.5 N HCl at a bipolar membrane voltage of 2.57 volts and a current density of 3 amp./dm.$^2$ with $\eta_H$=$\eta_{OH}$=85%. Though the voltage and the current density are more improved than in Japanese patent publication No. 3962/57, it cannot be said that these properties are much better.

The same remarks also apply to Japanese patent publication No. 16633/63. Even apart from these properties, one of the disadvantages of the conventional bipolar membrane techniques so far proposed is a short life of the bipolar membranes. That is to say, when the electrodialysis is continued for a prolonged period of time, peeling takes place at the bonded surfaces of the bipolar membranes or at the applied surface partially or entirely, and as a result an increase in voltage and a decrease in current efficiency are brought about.

The present inventors have made a number of studies to overcome the fatal disadvantages of the conventional bipolar membrane technique such as:

(a) short life,
(b) technical difficulty and uneconomy in preparing bipolar membranes, and
(c) insufficient electrochemical and physical properties, and have found a novel method for producing an acid and/or an alkali by means of ion exchange membranes without using bipolar membranes.

According to the present invention, the object of producing an acid and/or an alkali can be attained by filling an aqueous solution or suspension containing at least one electrolyte which is incapable of passing through an ion exchange membrane and selected from the group consisting of (1) water-soluble polyelectrolytes having negatively charged fixed groups and (2) finely pulverized water insoluble solid electrolytes having negatively charged fixed groups, and, if necessary, further containing polyvalent metal ions in a valence state of at least 2 in each of several water decomposition compartments comprised of an anion exchange membrane on the anode side and a cation exchange membrane on the cathode side and applying a direct electric current through the compartment in a direction to allow the direct electric current to flow from the anion exchange membrane towards the cation exchange membrane within the water decomposition compartment.

The present invention will be now explained in detail with reference to the accompanying drawings.

Figure 1:
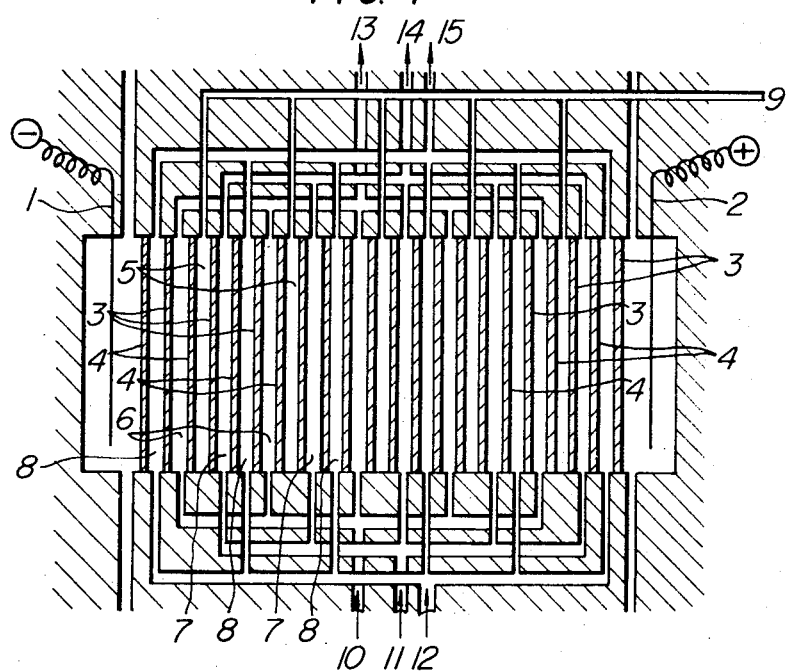
FIG. 1 is a schematic view of one embodiment of an apparatus for carrying out the present invention.

In FIG. 1, an embodiment of a method for producing an acid and an alkali according to the present invention is illustrated. That is, a plurality of anion exchange membranes 3 and cation exchange membranes 4 are alternately juxtaposed at a predetermined membrane distance between a pair of a cathode 1 consisting of a suitable cathode material such as graphite, iron, nickel, stainless steel or the like, and an anode 2 consisting of such a suitable anode material as graphite, platinum, titanium, tantalum or zirconium coated with a noble metal such as platinum, etc., to form a plurality of acid compartments 6, water decomposition compartments 5, alkali compartments 7 and salt compartments 8, in this order, where the membranes act as partitions between those compartments. An aqueous solution or suspension containing at least one electrolyte which is incapable of passing through the ion exchange membrane and is selected from the group consisting of (1) water-soluble polyelectrolytes having negatively charged fixed groups and (2) finely pulverized water-insoluble solid electrolytes having negatively charged fixed groups, and if necessary, polyvalent metal ions in a valence state of at least 2, preferably in a valence state from 2 to 4, is filled in each of the water decomposition compartments 5. Water or an acidic solution is fed to the acid compartments 6 from a common feed pipe 10, while water or an alkaline solution is fed to the alkali compartments 7 from a common feed pipe 11, and a salt solution is fed to the salt compartments 8 from a common feed pipe 12. A D.C. voltage is applied between the cathode and the anode provided at both ends to pass direct current through the cell in such a direction that electric current flows in the water decomposition compartment from the anion exchange membrane side to the cation exchange membrane side.

On and during application of D.C. voltage in the above-mentioned direction, the water inside each of the water decomposition compartments is decomposed to generate hydrogen ions $H^+$ and hydroxyl ions within the water decomposition compartment.

At the same time, the hydrogen ions, $H^+$, generated within each of the water decomposition compartments 5 travel into the acid compartments 6 through the cation exchange membranes 4 constituting one partition on the cathode side of the water decomposition chambers 5, while anions formed within each of the salt compartments 8 travel into the adjacent acid compartment 6 through the anion exchange membrane 3 constituting one partition on the anode side of the salt chamber 8, whereby an acid is formed in each of acid compartments 6. On the other hand, the hydroxyl ions generated within each of the water decomposition compartments 5 travel into the adjacent alkali compartment through the anion exchange membrane constituting one partition on the anode side of the water decomposition compartment while the cations within each of the salt compartments 8 travel into the adjacent alkali compartments through the cation exchange membranes 4 constituting one partition on the cathode side of the salt compartment, whereby an alkali is formed in the alkali compartments 7.

In the meantime, water in the water decomposition compartments 5 is consumed by passing an electric current due to the decomposition of water and electrodialysis, and thus water must be supplied to the water decomposition compartments 5 by a suitable means, for example, through a pipe 9 connected to the water decomposition compartments 5. According to another means, the water within the water decomposition compartments 5 is circulated between a water circulating tank provided outside the dialysis cell and the water decomposition compartments 5 and an amount of water corresponding to the water loss due to the decomposition and electrodialysis is supplied to the water circulating tank.

The solutions passed through the acid compartments 6, alkali compartments 7 and salt compartments 8 individually are led to the outside of the electrodialysis cell through the respective common discharge pipes 13, 14 and 15 correspondingly.

When a strong acid and a strong base are to be prepared by decomposing such a strong acid-strong base type salt as NaCl, an electrodialysis cell having such a structure as explained above is necessary, but when a salt of a weak acid or weak base is to be decomposed, the structure of the electrodialysis cell can be much simplified.

For example, when sodium acetate is to be decomposed, it is not necessary to inhibit the travelling of the hydrogen ions by means of the anion exchange membrane, because the acetic acid formed is a weak acid. Thus, only a cation exchange membrane is placed between a water decomposition compartment and the next water decomposition compartment, and the anion exchange membrane can be omitted from between said compartments. By carrying out electrolysis while an aqueous sodium acetate solution is passed to the compartment which is adjacent to each of the water decomposition compartments and receive the hydrogen ions, the salt compartments which are comprised of cation exchange membranes on both sides can serve as the acid compartments at the same time, and acetic acid can be formed in the salt compartments.

When a salt of a weak base is to be decomposed, a cation exchange membrane is omitted from between a water decomposition compartment and the next water decomposition compartment and only an anion exchange membrane is inserted therebetween, contrary to the decomposition of a salt of weak acid. In these cases, one kind of compartments can be eliminated, and consequently, one piping system as well as one storage vessel system can be eliminated.

As the electrolytes incapable of passing through the ion exchange membrane, water-soluble polymeric electrolytes having linear structures or slightly crosslinked structures having negatively charged fixed groups are suitable. For example, such polymers having negatively charged fixed groups as polystyrene sulfonic acid or its salts, acidic sulfuric acid esters of polyvinyl alcohol, polyvinyl sulfonic acid, etc. can be used.

As finely pulverized solid electrolytes having negatively charged fixed groups and capable of forming a solid electrolyte suspension using water as a medium, finely powdered cation exchange resins can be used. For example, such cation exchange resins pulverized by a ball mill, sand mill, roll mill, attrition mill or other pulverizer to less than several tens of microns, preferably less than several microns, as Amberlite IR–120B, IR–200, IR–124, XE–100, Diaion SK 1A, SK 1B, PK 204, etc. can be used.

The concentration of said water soluble polymeric electrolytes in the aqueous solution or the concentration of solid electrolytes in the suspension is usually at least 1% by weight, preferably at least 5% by weight.

If the polymer such as protein has both negatively and positively charged fixed groups, it can be employed so long as the polymer is predominantly in a negative state under the service conditions.

It can be presumed that water molecules are decomposed, and H+ and OH− are generated at the membrane boundary surfaces between the anion exchange membranes 3 constituting one partition on the anode side of the water decomposition compartments 5 and the aqueous solution or suspension in contact with the membranes when the polymeric electrolytes having negatively charged fixed groups are used.

In order to reduce the voltage which rises as time passes, it is effective to have present polyvalent metal ions in a valence state of at least 2. For example, it is effective to have present such metallic ions as $Ca^{++}$, $Mg^{++}$, $Fe^{++}$, $Fe^{+++}$, $Cr^{++}$, $Cr^{+++}$, etc. Among them, the presence of $Cr^{+++}$ exerts a particularly remarkable effect.

An initial amount of such metal ions which are present in the aqueous solution or suspension is usually at least 1% equivalent based on the fixed groups, preferably more than 10% equivalent. The use of such metal ions in an amount more than 10% is also effective, but is not economically attractive.

Such metal ions tend to be removed from the water decomposition compartments in the course of the progress of electrodialysis, but once the ions are added to the aqueous solution or suspension from the beginning, the voltage can be continually kept at a low and stable value, even after such ions have been removed therefrom at a lower stage.

Even in case the voltage is slightly increased due to the prolonged operation of electrodialysis, the initial voltage can be resumed by adding such metal ions thereto again at that time.

As regards the addition of at least divalent ions, any one of the following procedures is employed, depending upon the object and conditions of electrodialysis.

(a) No addition at all
(b) Addition only at the initial stage
(c) Intermittent addition
(d) Continual addition In order to establish stabilized operation for a prolonged period of time, it is desirable to effect either intermittent addition or continual addition, independently of the conditions of electrodialysis, (d) being superior.

A satisfactory theoretical explanation of such strange phenomena has not been made yet, but it seems that the presence of such metal ions has an influence upon the state of the polyelectrolytes adsorbed on the surface of the cation exchange membranes 4 or anion exchange membranes 3 constituting partition walls of the water decomposition compartments 5.

Applications of the present method for generating hydrogen ions and hydroxyl ions in industry cover quite a wide field. As will be explained in the following examples, production of NaOH and HCl from NaCl, recovery of $CH_3COOH$ and NaOH from $CH_3COONa$ and many other applications including decomposition of inorganic salts and organic salts into corresponding acids and alkalis can be enumerated.

The present invention will be hereunder explained in detail, referring to examples.

All the ion exchange membranes used in the following examples are types CK-1, cation exchange membranes, and CA-1, anion exchange membranes, made by Asahi Kasei Kogyo K.K. Japan, and were prepared from polymeric styrene-divinyl benzene as a matrix, to which sulfonic groups or quaternary ammonium groups were respectively introduced.

EXAMPLE 1

100 g. of polystyrene (GP–683–K27–32) made by Asahi Dow K.K. Japan was subjected to reaction with 2.3 kg. of concentrated sulfuric acid at 90° C. for 48 hours for dissolution and then the resulting solution was poured into water. After the dilution with water, excess sulfuric acid was removed by diffusion dialysis by means of parchmentized paper, and concentration was effected at 50° C. by evaporation in vacuo, whereby a polystyrene sulfonic acid solution having a 1.0 N H+ ion concentration was obtained.

A solution prepared by adding 30% by equivalent of ferric sulfate, on the basis of the fixed groups, to the aqueous solution of polystyrene sulfonic acid was filled in water decomposition compartments whose partitioning anion exchange membranes were placed on the anode side and whose partitioning cation exchange membranes were placed on the cathode side. A 0.5 N NaOH solution was placed in the compartments at the outsides of the anion exchange membranes of the water decomposition compartments and a 0.5 N HCl solution was placed in the compartments at the outsides of the cation exchange membrane of the water decomposition compartments. A direct electric current was passed at a current density of 3 amp./dm.² through the cell to effect electrodialysis. The transport numbers were measured. That is, such data were obtained, as the H+ (or OH−) ion transport number was 0.95 (which corresponded to the current efficiency), the Na+ ion transport number was 0.02 and the Cl− ion transport number was 0.03.

As electrode materials, a platinum anode and a silver chloride cathode were used.

Pure water was added to the water decomposition compartments only in an amount corresponding to the water loss during the electrodialysis. The effective current-passing area of the ion exchange membrane used was 18 cm.² per sheet.

Figure 2:
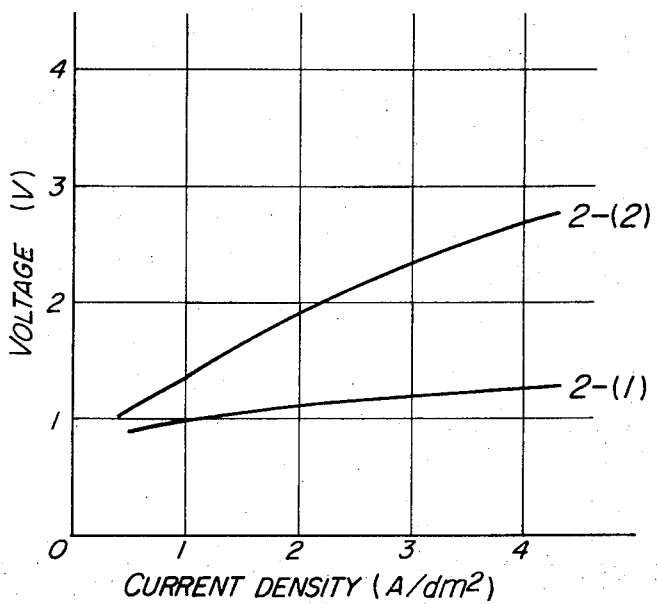
FIGS. 2 and 3 are diagrams illustrating several embodiments of the present invention.

The voltage applied to the water decomposition compartments having a membrane distance of 0.75 mm. is shown in FIG. 2 as a curve 2–(1).

The measurement of the voltage was effected by placing an alkaline sodium chloride solution containing NaOH in 0.4 N and NaCl in 0.1 N in the compartments at the outsides of the anion exchange membranes of the water decomposition compartments, the former solution being isolated from the latter with a cation exchange membrane interposed therebetween, placing an acidic sodium chloride solution containing HCl in 0.4 N and NaCl in 0.1 N in the compartments at the outsides of the cation exchange membranes of the water decomposition compartments, the former solution being isolated from the latter with an anion exchange membrane interposed therebetween, passing the direct current through the cell until the $Fe^{+++}$ and $SO_4^{--}$ ions added to the polystyrene sulfonic acid solution are no longer observed in both solutions of acid and alkali compartments, while solutions in these compartments are kept being renewed, then passing the current at a predetermined current density and measuring a potential difference between the silver chloride electrodes provided near the membrane surfaces by means of a vacuum tube-type potentiometer.

EXAMPLE 2

Ion exchange resins (Dowex-50W, X–2 manufactured by Dow Chemical Co., U.S.A.) were pulverized to fine particles in a ball mill for 100 hours, and suspended in water at a rate of 0.5 equivalent exchange capacity/l. The thus prepared suspension was filled in the water decomposition compartments and the transport numbers were measured by passing the current under the same conditions as in Example 1.

The transport number of H+ ions (OH− ions) was 0.938, that of Na+ ions 0.028 and that of Cl− ions 0.034.

The change in voltage with the current density is given in FIG. 2 as a curve 2–(2).

EXAMPLE 3

Figure 3:
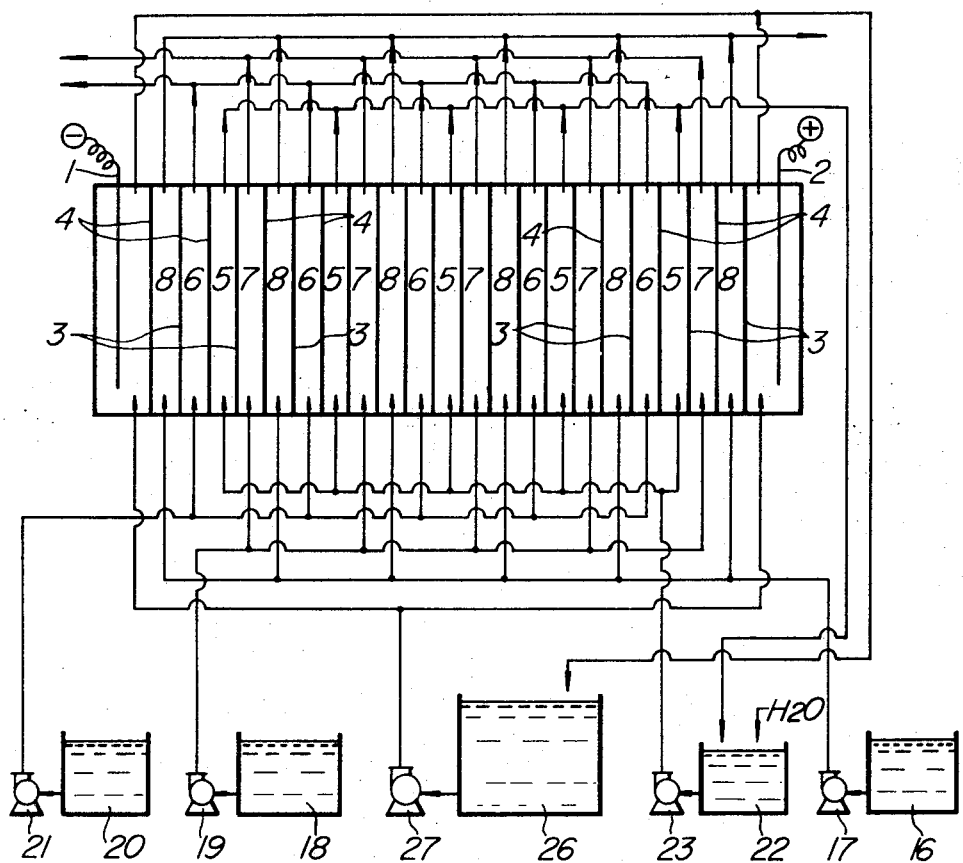

The electrodialysis cell and other necessary facilities as shown in FIG. 3 were used.

Anion exchange membranes 3 and cation exchange membranes 4, each having an effective current-passing area of 6 cm. x 40 cm., were juxtaposed alternately at a membrane distance of 0.75 mm., as shown in FIG. 3, whereby six salt compartments 8, five water decomposition compartments 5, five acid compartments 6 and five alkali compartments 7 were formed in the order of 6, 5, 7, 8 from the cathode to the anode. A 10 mm.-thick titanium plate plated with a 5-micron-thick platinum layer was used as an anode 2, and a 20 mm.-thick stainless steel plate was used as a cathode 1. A multi-compartment electrodialysis apparatus was assembled from said elements and tests were conducted in the following manner.

A 0.579 N NaCl solution was fed to the salt compartments 8 from a salt water feed tank 16 provided outside the dialysis apparatus by means of a salt water feed pump 17. A 0.213 N NaOH solution was fed to the alkali compartments 7 from an alkali feed tank 18 by means of an alkali feed pump 19. A 0.198 N HCl solution was fed to the acid compartments 6 from an acid feed tank 20 by means of an acid feed pump 21.

A polystyrene sulfonic acid solution having a 1.0 N $H^+$ ion concentration and being prepared in Example 1 (no polyvalent metal ions being added thereto) was fed to the water decomposition compartments 5 from a polyelectrolyte solution circulation tank 22 by means of a polymeric electrolyte solution circulation pump 23, and the solution leaving the water decomposition compartments 5 was allowed to return to the polymeric electrolyte solution circulation tank 22. Water was supplied to the tank in an amount corresponding to water loss due to the decomposition of water, etc.

Tests were conducted by changing flow rates of the solution passing through the acid compartments, alkali compartments and salt compartments to various degrees while keeping the linear velocity of the flow of the polymeric electrolyte solution through the water decomposition compartments 5 constantly at 0.017 cm./sec. and keeping the direct current passing between both electrodes constantly at 7.2 amp. (3 amp./dm.$^2$). The results are given in Table 1.

A 0.5 N $Na_2SO_4$ solution, whose pH was adjusted to 2, was circulated between electrode compartments 24 and 25 at both ends and an electrode solution circulation tank 26 by means of an electrode circulation pump 27.

in Example 1, and the following results were obtained (the current densities were all 3 amp./dm.$^2$):

| Additive | Stabilized voltage, volts |
|---|---|
| $CaCl_2$ | 2.05 |
| $MgSO_4$ | 2.05 |
| $Fe_2(SO_4)_3$ | 1.90 |
| $Cr_2(SO_4)_3$ | 1.70 |
| None | 2.10 |

EXAMPLE 5

Electrodialysis was conducted by using the same apparatus as used in Example 3, except that the solid electrolyte suspension prepared in Example 4, to which $$Cr_2(SO_4)_3$$

was added so that its concentration might be 0.12 N, was used as the water decomposition compartment solution.

Current was continuously passed at 7.2 amp. (3 amp./dm.$^2$) for 56.0 hours at the same concentration of the feed solutions and flow velocity conditions as in No. 2 of Example 3. The voltage between both end membranes was increased to 10.2 volts, through 9.6 volts at the start.

At that point, $Cr_2(SO_4)_3$ was added to the suspension at the $Cr^{+++}$ concentration of 0.12 N and the voltage was again lowered to 9.6 volts after about one hour. Then, $Cr_2(SO_4)_3$ was added to the suspension every 60 hours.

After a continuous operation was conducted for a total duration of 357 hours, the voltage could be always kept within a range of 9.6–10.2 volts, and no abnormality was observed at all in the apparatus, when the apparatus was dismantled and inspected.

What we claim is:

1. A method for generating hydrogen ions and hydroxyl ions by the electrical decomposition of water which comprises passing a direct electric current through a suspension of finely pulverized water-insoluble polyelectrolytes having negatively charged fixed groups and obtaining hydrogen ions from said suspension by electrodialysis of the hydrogen ions through a cation exchange membrane

TABLE 1

| Test No. | Voltage between both end membranes (v.) | Acid compartment | | | Alkali compartment | | | Salt compartment | |
|---|---|---|---|---|---|---|---|---|---|
| | | Flow velocity within cell (cm./sec.) | Effluent concentration (H+N) | Current efficiency (percent) | Flow velocity within cell (cm./sec.) | Effluent concentration (OH-N) | Current efficiency (percent) | Flow velocity within cell (cm./sec.) | Effluent concentration (Cl-N) |
| 1 | 10.2 | 0.681 | 0.405 | 89.0 | 0.267 | 0.750 | 93.5 | 1.343 | 0.492 |
| 2 | 10.2 | 0.767 | 0.373 | 90.0 | 0.270 | 0.747 | 93.6 | 1.346 | 0.493 |
| 3 | 10.3 | 0.837 | 0.358 | 90.5 | 0.270 | 0.751 | 93.8 | 1.346 | 0.492 |
| 4 | 10.4 | 0.930 | 0.341 | 91.2 | 0.270 | 0.750 | 94.1 | 1.330 | 0.490 |
| 5 | 10.2 | 0.770 | 0.370 | 90.2 | 0.308 | 0.692 | 95.5 | 1.346 | 0.492 |
| 6 | 10.3 | 0.774 | 0.372 | 90.1 | 0.341 | 0.647 | 96.2 | 1.343 | 0.491 |
| 7 | 10.2 | 0.759 | 0.375 | 90.1 | 0.236 | 0.826 | 93.1 | 1.336 | 0.491 |
| 8 | 10.2 | 0.770 | 0.370 | 90.0 | 0.192 | 0.966 | 92.9 | 1.327 | 0.489 |
| 9 | 10.3 | 0.767 | 0.373 | 89.9 | 0.271 | 0.745 | 93.5 | 1.525 | 0.510 |
| 10 | 10.2 | 0.785 | 0.367 | 90.1 | 0.272 | 0.746 | 93.7 | 1.642 | 0.518 |
| 11 | 10.2 | 0.763 | 0.367 | 90.2 | 0.270 | 0.746 | 93.6 | 1.762 | 0.524 |
| 12 | 12.8 | 0.767 | 0.369 | 87.9 | 0.270 | 0.734 | 91.8 | 0.605 | 0.391 |
| 13 | 9.9 | 0.396 | 0.458 | 72.5 | 0.157 | 1.042 | 82.9 | 1.216 | 0.507 |

EXAMPLE 4

A porous type cation exchange resin containing sulfonic groups and having a degree of cross-linking of 2, Diaion PK 204 (a trademark of a product made by Mitsubishi Kasei Kogyo K. K., Japan) was pulverized to a mean particle size of about one micron by a pulverizer and suspended in water so that the resin concentration was 8.6%.

$CaCl_2$, $MgSO_4$, $Fe_2(SO_4)_3$ and $Cr_2(SO_4)_3$ each was added to the individual suspensions so that each suspension might contain any one of these additives at a concentration of 0.12 N.

The stabilized voltages were determined by using the potentiometer, the conditions and the manners as used placed on the cathode side of said suspension and hydroxyl ions from said suspension by electrodialysis of the hydroxyl ions through an anion exchange membrane placed on the anode side of said suspension.

2. A method according to claim 1, wherein the water insoluble polyelectrolytes are cation exchange resins.

3. A method according to claim 1, wherein at least 1% by weight of the finely pulverized water insoluble polyelectrolytes is contained in the water.

4. A method according to claim 1, wherein said suspension further contains polyvalent metal ions in an at least 2 valence state.

5. A method according to claim 4, wherein the water insoluble polyelectrolytes are pulverized cation exchange resins.

6. A method according to claim 4, wherein at least 1% by weight of the finely pulverized water insoluble polyelectrolyte is contained in the water.

7. A method according to claim 4, wherein said polyvalent metal ions are $Ca^{++}$, $Mg^{++}$, $Fe^{++}$, $Fe^{+++}$, $Cr^{++}$, or $Cr^{+++}$.

8. A method according to claim 4, wherein said polyvalent metal ions are contained in an amount of at least 1% equivalent, based on the fixed groups of the finely pulverized water insoluble polyelectrolyte.

9. A method for producing acid and alkali by electrodialysis in a cell comprised of a plurality of cation exchange membranes and anion exchange membranes alternately juxtaposed between an anode and a cathode, which comprises (a) filling an aqueous solution of a salt, an aqueous solution of an acid, a suspension of finely pulverized water insoluble polyelectrolytes having negatively charged fixed groups, and an alkali solution in the respective compartments in this order consecutively, in which the suspension is placed in the compartment, called water decomposition compartment, partitioned by the cation exchange membrane on its cathode side and by the anion exchange membrane on its anode side, and (b) passing a direct electric current between the anode and the cathode in such a direction as to allow the electric current to pass in each of said water decomposition compartments from the anion exchange membrane towards the cation exchange membrane.

10. A method according to claim 9, wherein the water insoluble polyelectrolytes are cation exchange resins.

11. A method according to claim 9, wherein at least 1% by weight of the finely pulverized water insoluble polyelectrolytes is contained in the water.

12. A method according to claim 9 wherein said suspension to be filled in the water decomposition compartments further contains polyvalent metal ions in a valence state of at least 2.

13. A method according to claim 12, wherein the water insoluble polyelectrolytes are pulverized cation exchange resins.

14. A method according to claim 12, wherein at least 1% by weight of the finely pulverized water insoluble polyelectrolytes are contained in the water.

15. A method according to claim 12, wherein said polyvalent metal ions are $Ca^{++}$, $Mg^{++}$, $Fe^{++}$, $Fe^{+++}$, $Cr^{++}$, or $Cr^{+++}$.

16. A method according to claim 12, wherein said polyvalent metal ions are contained in an amount of at least 1% equivalent, based on the fixed groups of the finely pulverized water insoluble polyelectrolytes.

References Cited

UNITED STATES PATENTS

| | | | |
|---|---|---|---|
| 2,721,171 | 10/1955 | Arnold et al. | 204—180 P |
| 2,815,320 | 12/1957 | Kollsman | 204—180 P |
| 2,923,674 | 2/1960 | Kressman | 204—180 P |
| 3,291,713 | 12/1966 | Parsi | 204—180 P |
| 3,330,750 | 7/1967 | McRae et al. | 204—180 P |

FOREIGN PATENTS

| | | | |
|---|---|---|---|
| 212,364 | 2/1957 | Australia | 204—180 P |
| 236,144 | 12/1958 | Australia | 204—180 P |

JOHN H. MACK, Primary Examiner

A. C. PRESCOTT, Assistant Examiner

U.S. Cl. X.R.

204—301